US011878357B2

(12) United States Patent
Tezawa (10) Patent No.: US 11,878,357 B2
(45) Date of Patent: Jan. 23, 2024

(54) TIP DRESSING CUTTER

(71) Applicant: KYOKUTOH CO., LTD., Aichi (JP)

(72) Inventor: Kazuhiro Tezawa, Aichi (JP)

(73) Assignee: KYOKUTOH CO., LTD., Aïchi (JP)

( * ) Notice: Subject to any disclaimer, the term of this patent is extended or adjusted under 35 U.S.C. 154(b) by 811 days.

(21) Appl. No.: 17/012,116

(22) Filed: Sep. 4, 2020

(65) Prior Publication Data

US 2020/0398351 A1 Dec. 24, 2020

Related U.S. Application Data

(63) Continuation of application No. PCT/JP2019/015619, filed on Apr. 10, 2019.

(30) Foreign Application Priority Data

Apr. 16, 2018 (JP) ................. 2018-078396

(51) Int. Cl.
*B23K 11/30* (2006.01)
*B23K 11/11* (2006.01)
*B23C 5/12* (2006.01)

(52) U.S. Cl.
CPC ............. *B23C 5/12* (2013.01); *B23K 11/11* (2013.01); *B23K 11/3072* (2013.01); *B23C 2200/128* (2013.01); *B23K 11/3063* (2013.01)

(58) Field of Classification Search
CPC . B23K 2103/10; B23K 11/11; B23K 11/3072; B23K 11/3063; B23K 11/30;

(Continued)

(56) References Cited

U.S. PATENT DOCUMENTS 4,966,506 A * 10/1990 Slanker .................. B23B 5/166
409/181
5,993,125 A * 11/1999 Shimada ............ B23K 11/3063
409/181

(Continued)

FOREIGN PATENT DOCUMENTS

CN 103298580 A 9/2013
CN 105658369 A 6/2016

(Continued)

OTHER PUBLICATIONS

International Search Report dated Jul. 2, 2019 from corresponding International Patent Application No. PCT/ JP2019/015619, 6 pages.

(Continued)

*Primary Examiner* — Sara Addisu
(74) *Attorney, Agent, or Firm* — Ruggiero McAllister & McMahon LLC (57) ABSTRACT

A cutter includes a rake face on which a recessed groove extending along a direction of a rotation axis of a rotary holder to be open at a flank face of the cutter are formed. The recessed groove includes a plurality of recessed grooves formed at predetermined intervals along a direction intersecting with the rotation axis. A cutting blade portion extending along a direction intersecting with the rotation axis is provided on a continuous portion of the rake face and the flank face. The cutting blade portion includes a first region made up of an intersecting portion of the rake face and the flank face and a second region made up of a peripheral edge portion of an opening portion of the recessed groove at the flank face.

3 Claims, 8 Drawing Sheets (58) Field of Classification Search
CPC .............. B23B 5/166; B23B 2200/128; B23C 2200/128
See application file for complete search history.

(56) References Cited

U.S. PATENT DOCUMENTS

| | | | |
|---|---|---|---|
| 6,186,705 | B1 | 2/2001 | Kumar |
| 8,222,560 | B2 | 7/2012 | Sigler et al. |
| 10,610,956 | B2 * | 4/2020 | Sigler ................... B23B 5/166 |
| 10,717,149 | B2 | 7/2020 | Tezawa |
| 2008/0075551 | A1 | 3/2008 | Nakazima |
| 2008/0078749 | A1 | 4/2008 | Sigler et al. |
| 2014/0064863 | A1 | 3/2014 | Nakajima |
| 2016/0089747 | A1 | 3/2016 | Tezawa |
| 2017/0225262 | A1 * | 8/2017 | Sigler ................ B23K 11/3063 |
| 2018/0236593 | A1 * | 8/2018 | Lanham ................ B23B 5/166 |
| 2021/0046552 | A1 * | 2/2021 | Tezawa ............. B23K 11/3063 |

FOREIGN PATENT DOCUMENTS

| | | | | |
|---|---|---|---|---|
| CN | 106624592 A | | 5/2017 | |
| DE | 20315287 U1 | * | 3/2005 | |
| DE | 20 2008 007 251 U1 | | 5/2009 | |
| DE | 10 2009 006 585 A1 | | 8/2010 | |
| DE | 10 2010 025 835 B3 | | 10/2011 | |
| DE | 102010025835 B3 | * | 10/2011 | ............. B23B 5/166 |
| DE | 10 2015 012 743 A1 | | 4/2017 | |
| DE | 102015012743 A1 | * | 4/2017 | ............. B23B 5/166 |
| EP | 844040 A1 | * | 5/1998 | ............. B23B 5/166 |
| EP | 1518631 A1 | * | 3/2005 | ............. B23B 5/166 |
| FR | 3014002 A1 | * | 6/2015 | ............. B23B 5/166 |
| JP | 62144885 A | * | 6/1987 | ............. B23B 5/166 |
| JP | 05305457 A | * | 11/1993 | |
| JP | 2001062571 A | * | 3/2001 | |
| JP | 2003245779 A | | 9/2003 | |
| JP | 2008023589 A | * | 2/2008 | ............. B23B 5/166 |
| JP | 2012210636 A | * | 11/2012 | |
| JP | 2017080764 A | * | 5/2017 | |
| WO | 2017/094041 A1 | | 6/2017 | |

OTHER PUBLICATIONS

Written Opinion dated Jul. 2, 2019 from corresponding International Patent Application No. PCT/JP2019/015619, 6 pages, 3 pages.
Extended European Search Report dated May 3, 2021 from European Patent Application No. 19789465.2, 6 pages.
Chinese Office Action dated Aug. 11, 2021 from corresponding Chinese Patent Application No. 2019800259182, 13 pages.
Indian Examination Report dated Jun. 14, 2021 from Indian Patent Application No. 202017048796, 5 pages.

* cited by examiner

TIP DRESSING CUTTER

CROSS-REFERENCE TO RELATED APPLICATIONS

This application is a continuation of International Application No. PCT/JP2019/015619, filed on Apr. 10, 2019, which claims the benefit under 35 U.S.C. § 119(a) from Japanese Patent Application No. 2018-078396, filed on Apr. 16, 2018, the contents of each of which is incorporated herein by reference in their entirety.

BACKGROUND OF THE DISCLOSURE

1. Field of the Disclosure

The present disclosure relates to a tip dressing cutter for use in cutting a distal end of an electrode tip of spot welding.

2. Description of the Related Art

It is generally known that when spot welding is performed on an aluminum material, an oxide film created during the welding renders the welding unstable. To address this, for example, U.S. Pat. No. 8,222,560 discloses that welding is stabilized by forming a surface having protrusions and/or depressions on distal ends of electrode tips of spot welding. This surface having protrusions and/or depressions on distal ends of electrode tips is formed by using a tip dressing cutter. The cutter is plate-shaped, and in use, attached to a rotary holder having a vertically extending rotation axis. The cutter includes a rake face extending to intersect with a circumferential extent around the rotation axis and a pair of flank faces formed on respective upper and lower parts of the rake face, wherein the rake and flank faces are generally orthogonal to each other. A plurality of recessed grooves are formed on each of the flank faces to be spaced at predetermined intervals in a direction along an intersecting portion of the rake face and the flank face. The recessed grooves extend in the circumferential direction around the rotation axis and are open at the rake face. A cutting blade is formed in a serpentine configuration with the intersecting portion of the rake face and the flank face and with a peripheral edge portion of an opening portion of the recessed groove on the rake face. When an electrode tip contacts a rotating rotary holder with a central axis of the electrode tip being aligned with the rotation axis, a plurality of concentric annular ribs are formed on a distal end of the electrode tip by the cutting blade having the serpentine configuration, and a grooved surface is thus formed on the distal end of the electrode tip.

SUMMARY

Figure 7:
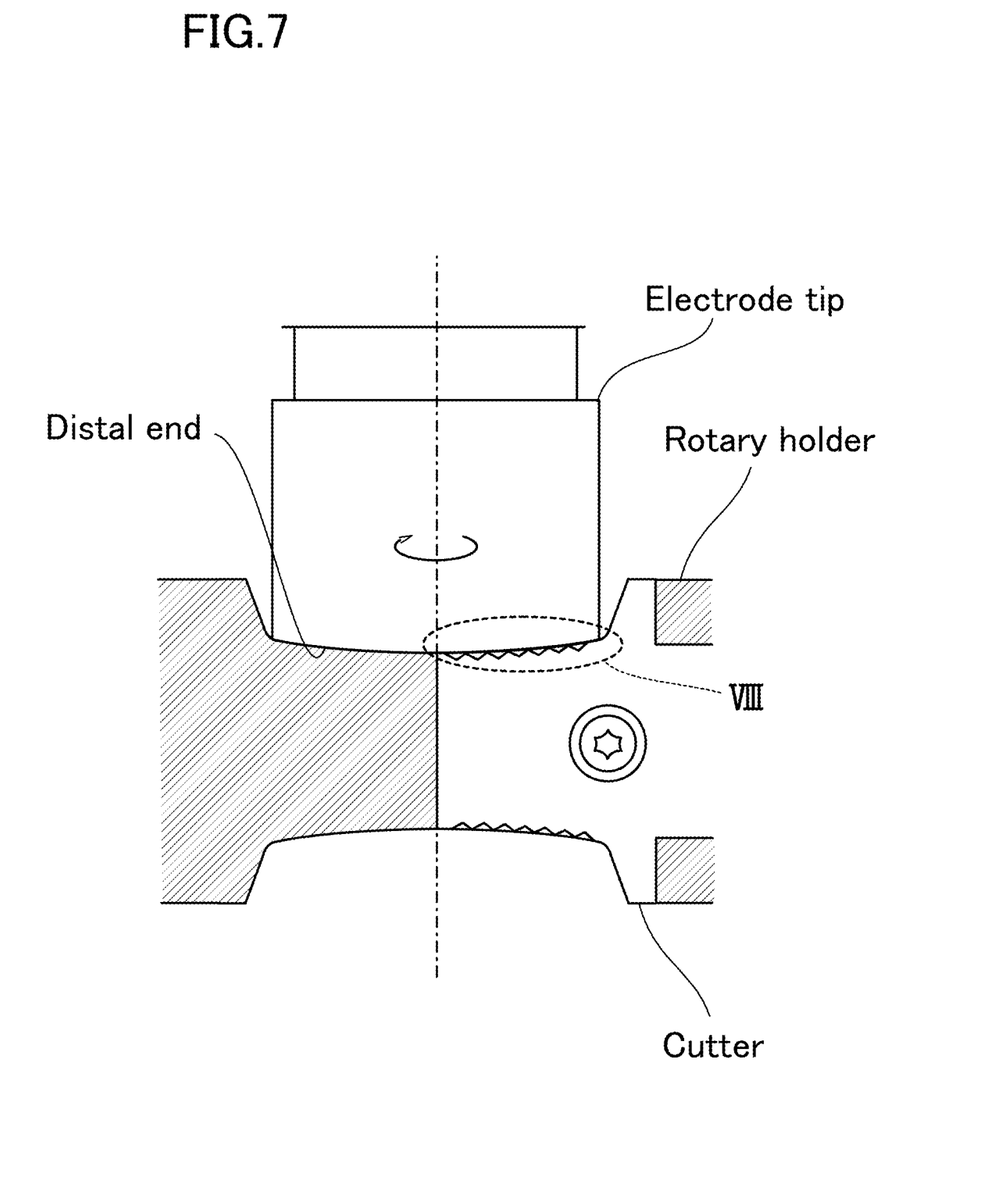
FIG. 7 is a view corresponding to FIG. 5 and illustrating a rotary holder to which a conventional cutter is attached.
Figure 8:
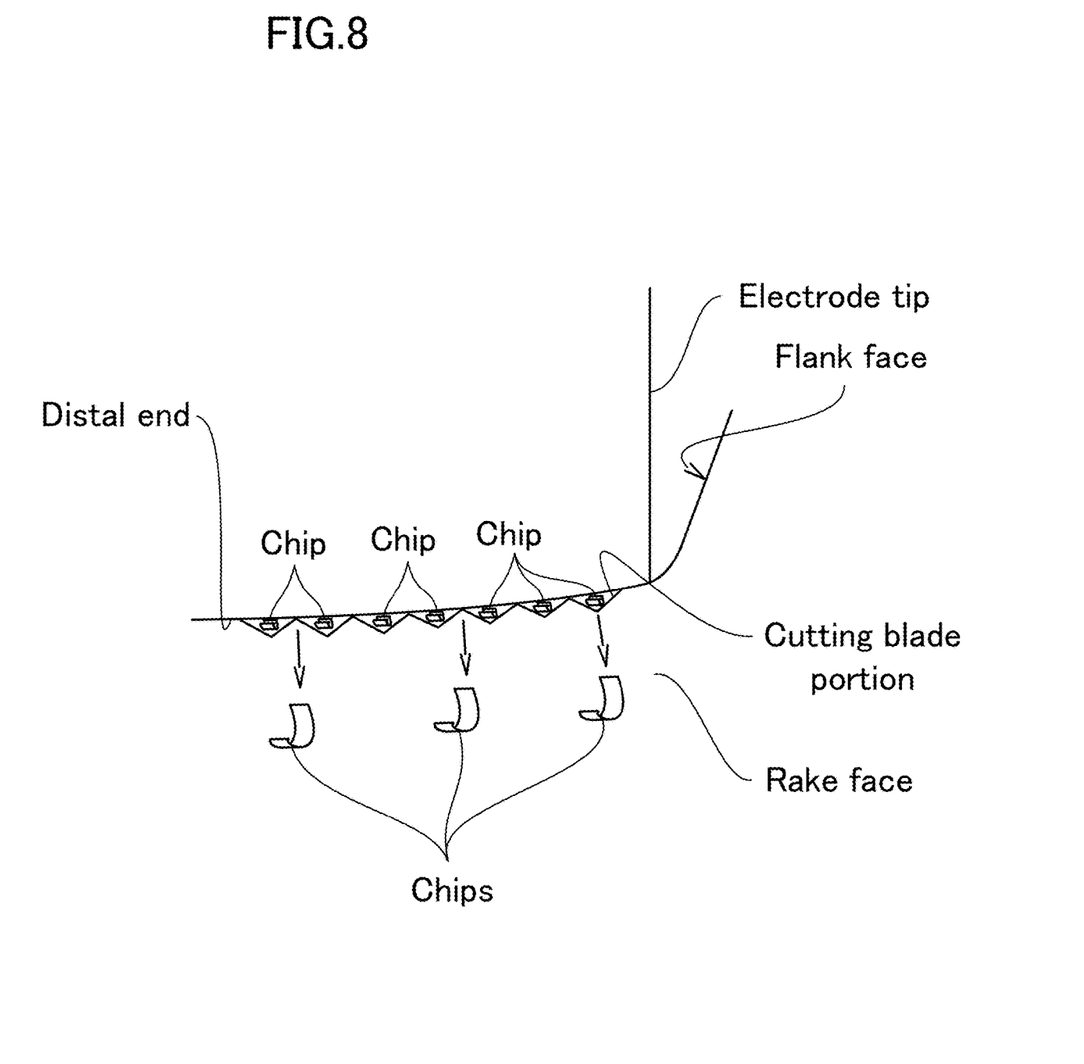
FIG. 8 is a view corresponding to FIG. 6 and illustrating a conventional cutter.

As a distal end of an electrode tip is cut by using the cutter as described in U.S. Pat. No. 8,222,560, chips are created along the rake face of the cutter. During this operation, some of the chips created move into gaps between the recessed grooves and the distal end of the electrode tip, as illustrated in FIGS. 7 and 8. As a result, chips in the gaps between the recessed grooves and the distal end of the electrode tip contact both of inner faces of the recessed grooves and the distal end of the electrode tip, thereby causing a large load on rotation of the rotary holder. This may result in a breakdown of apparatuses or a non-well-formed grooved surface on the distal end of the electrode tip.

When the cutter as described in U.S. Pat. No. 8,222,560 is then produced, the recessed grooves are needed to be formed on the flank face that faces the distal end of the electrode tip. The recessed grooves thus cannot be machined until a shape of the electrode tip is determined. Therefore, there is an issue of requiring lengthy lead time for developing the cutter.

The present disclosure is made in view of the foregoing, and the object of the present disclosure is to provide a tip dressing cutter that enables a decreased load on rotation of a rotary holder to reduce breakdown of apparatuses, repeated and neat formation of a grooved surface on a distal end of an electrode tip, and shorter lead time for development.

The present disclosure is characterized by forming a plurality of recessed grooves on a rake face rather than a flank face, to achieve the object.

Specifically, the present disclosure is directed to a tip dressing cutter attached to a rotary holder that is configured to rotate with a central axis of an electrode tip of spot welding being aligned with a rotation axis of the rotary holder, the tip dressing cutter being configured to contact a distal end of the electrode tip brought into proximity to the rotary holder during the rotation of the rotary holder to cut the distal end. The following solutions are then applied.

According to a first aspect of the present disclosure, the tip dressing cutter includes a rake face extending to intersect with a circumferential extent around the rotation axis; a flank face configured to face the distal end of the electrode tip when the electrode tip is brought into proximity to the rotary holder; a plurality of recessed grooves formed on the rake face to be spaced at predetermined intervals along a direction intersecting with the rotation axis, the plurality of recessed grooves extending along a direction of the rotation axis to be open at the flank face; and a cutting blade portion formed on a continuous portion of the rake face and the flank face and extending along a direction intersecting with the rotation axis, wherein the cutting blade portion includes a first region made up of an intersecting portion of the rake face and the flank face and a second region made up of a peripheral edge portion of an opening portion of the recessed groove at the flank face.

According to a second aspect of the present disclosure which is an embodiment of the first aspect of the present disclosure, the flank face includes a pair of flank faces formed to be spaced at a predetermined interval along the direction of the rotation axis, the recessed grooves extend along the direction of the rotation axis to be open at each of the flank faces, and the cutting blade portion includes a pair of cutting blade portions formed symmetrically along the direction of the rotation axis, one of the cutting blade portions being formed on a continuous portion of the rake face and one of the flank faces and the other of the cutting blade portions being formed on a continuous portion of the rake face and the other of the flank faces.

According to a third aspect of the present disclosure which is an embodiment of the first or second aspect, the recessed grooves are each straight.

In the first aspect of the present disclosure, when a distal end of an electrode tip is cut, a depth of a portion cut by the second region of the cutting blade portion is larger than that of the first region of the cutting blade portion. As a result, concentric annular ribs are formed on the distal end of the electrode tip to provide a grooved surface on the distal end of the electrode tip. As a distal end of an electrode tip is then cut by the cutter, chips created at the first region of the cutting blade portion are produced along the rake face and chips created at the second region of the cutting blade portion are produced along the recessed grooves. In that operation, no gaps are provided between the cutting blade portion and the distal end of the electrode tip. Thus, the movement of the created chips to between the recessed grooves and the distal end of the electrode tip, as described in U.S. Pat. No. 8,222,560, can be prevented. During the cutting operation to form a grooved surface on the electrode tip distal end, an excessive load thus can be prevented from being applied on the rotation of the rotary holder. Even when the cutting of the electrode tip distal end is repeated, a grooved surface can be then well-formed on the electrode tip distal end. In addition, the recessed grooves are formed on the rake face, but not on the flank face. The recessed grooves thus can be machined on a material before determining a shape of the electrode tip. Therefore, shorter lead time for developing the cutter can be achieved.

In the second aspect of the present disclosure, when the central axes of a pair of electrode tips that face one another are brought into alignment with the rotation axis of the rotary holder and the electrode tips are then brought into proximity to the rotating rotary holder to contact distal ends of the electrode tips with the cutter, a grooved surface is formed on each of the distal ends of the electrode tips. Thus, without increased numbers of the recessed grooves formed on the rake face, the grooved surface can be formed simultaneously on the distal ends of the two electrode tips. This enables higher efficiency in cutting the electrode tips.

In the third aspect of the present disclosure, simplified machining for producing the cutter is achieved, thus enabling further shorter lead time for the development of the cutter.

DETAILED DESCRIPTION

Embodiments of the present disclosure are described in detail below with reference to the drawings. It is noted that following description of the preferred embodiments is merely an example in nature.

Figure 1:
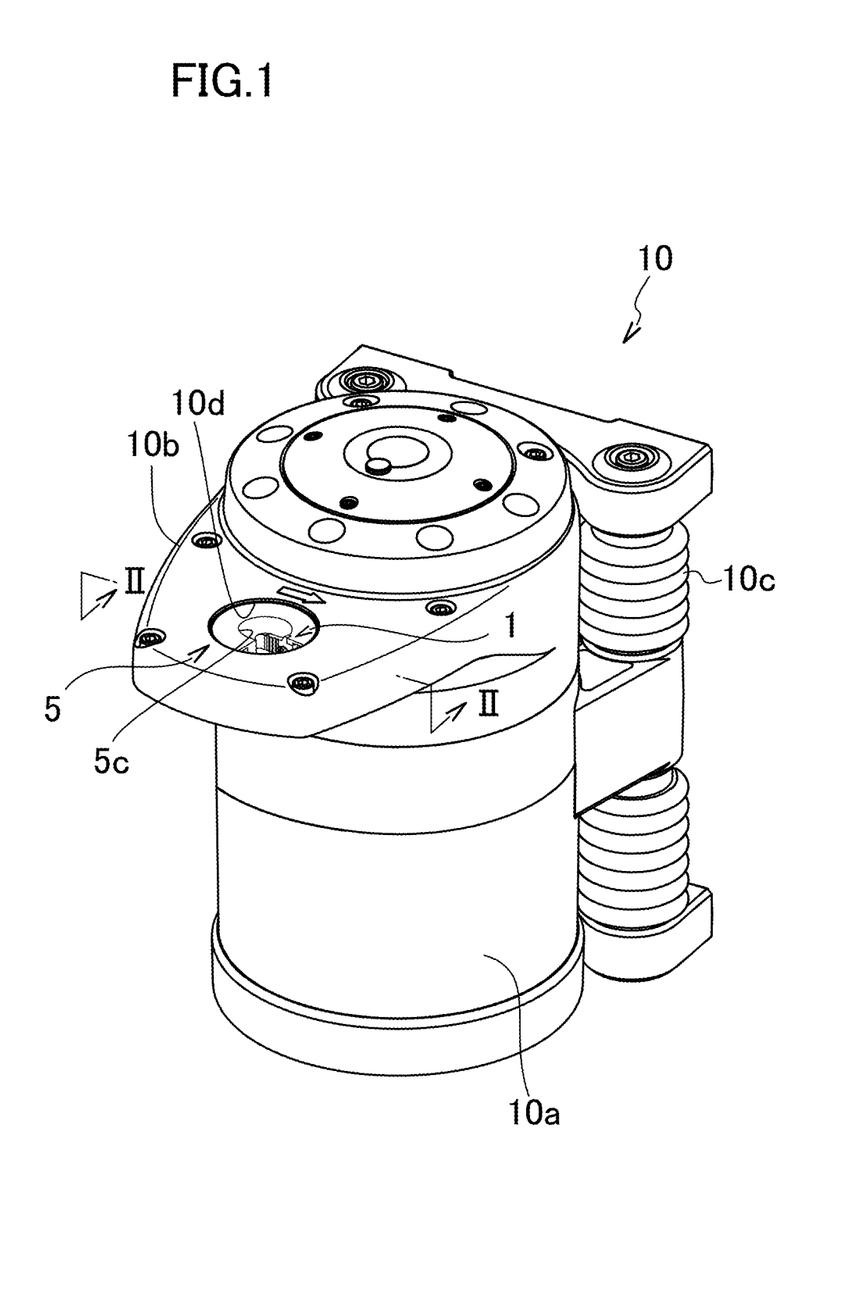
FIG. 1 is a perspective view of a tip dresser according to an embodiment of the present disclosure.

FIG. 1 illustrates a tip dresser 10 according to an embodiment of the present disclosure. The tip dresser 10 is used for cutting distal ends 11a of a pair of electrode tips 11 (see FIG. 2) fitting onto respective shanks of a welding gun (not shown) to be opposite one another. The tip dresser 10 includes a cylindrical motor housing 10a having a cylinder center line oriented vertically, a plate-shaped housing 10b extending horizontally from an upper end of the motor housing 10a, and a shock absorbing mechanism 10c attached to a side of the motor housing 10a and configured to absorb impact applied vertically on the motor housing 10a and the plate-shaped housing 10b. A drive motor (not shown) having a rotation axis extending upward is housed inside the motor housing 10a.

Figure 2:
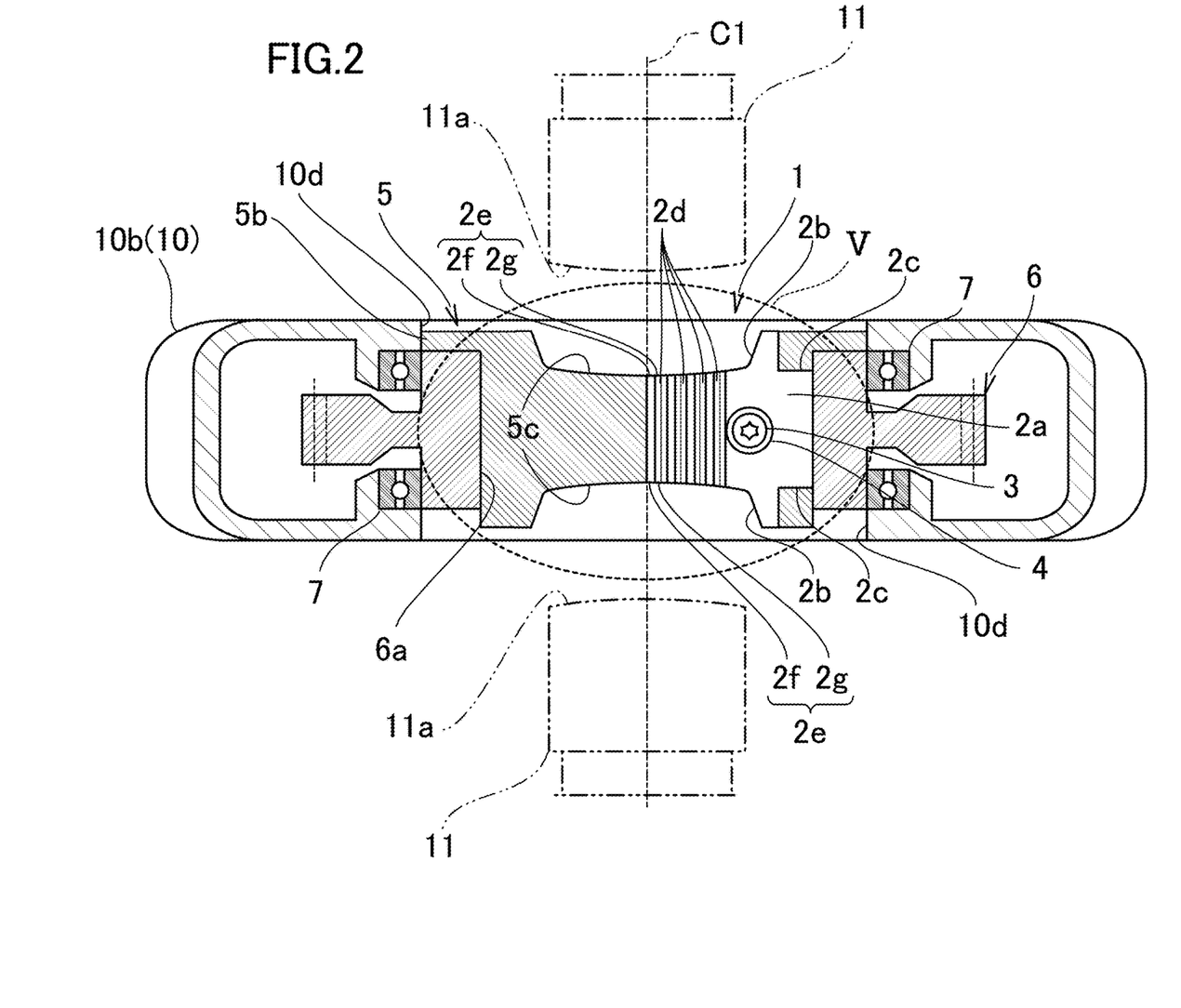
FIG. 2 is a cross-sectional view taken along a plane II-II indicated in FIG. 1.

As illustrated in FIG. 2, a pair of circular through holes 10d facing each other are formed in respective top and bottom surfaces of the plate-shaped housing 10b on an extension end side of the plate-shaped housing 10b.

In an interior of the plate-shaped housing 10b and between the through holes 10d, a ring-shaped output gear 6 is mounted rotatably about a vertically extending rotation axis C1 via a pair of upper and lower bearings 7. The output gear 6 is configured to be rotated about the rotation axis C1 by the drive motor and a gear meshing mechanism that are not shown.

Figure 3:
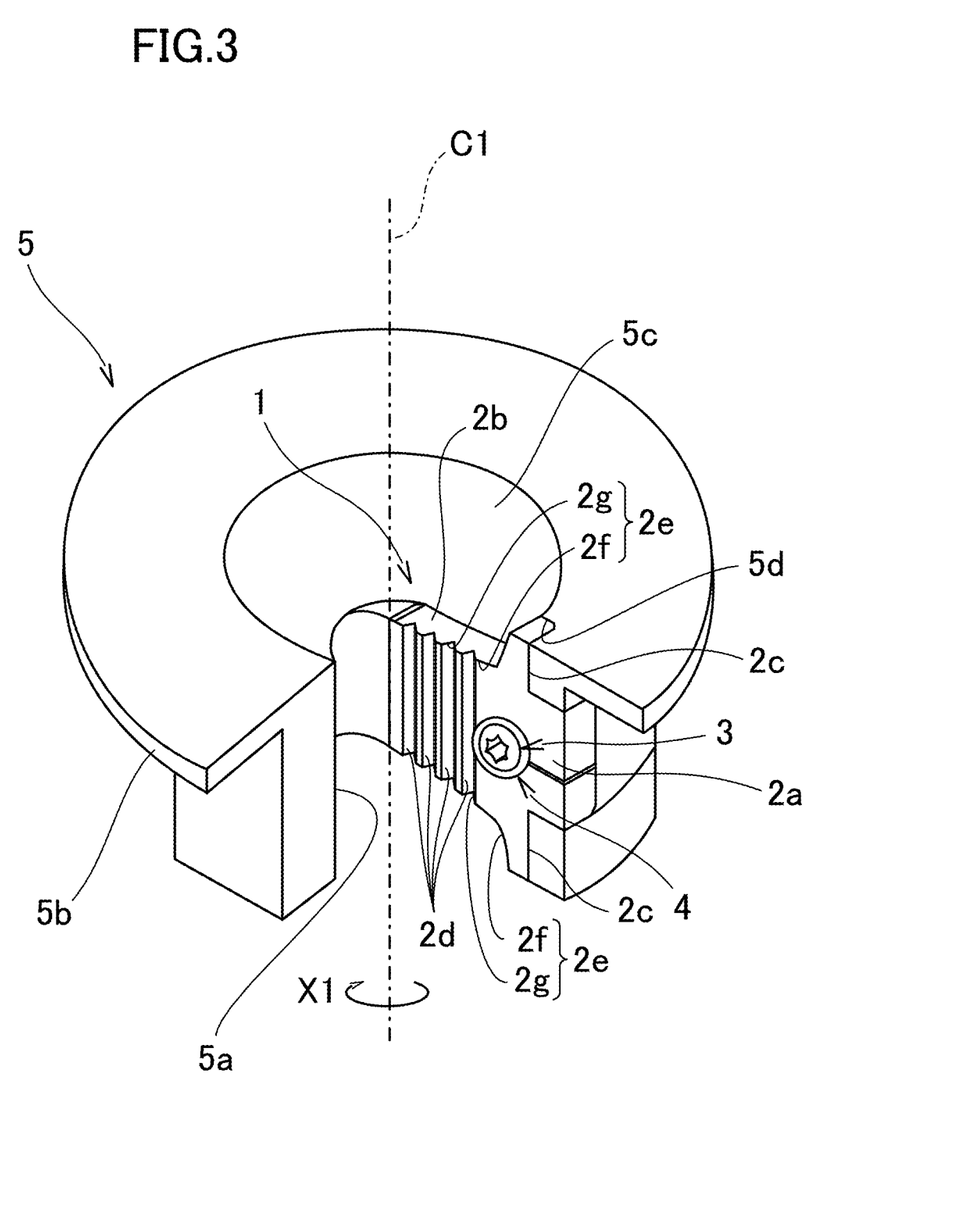
FIG. 3 is a perspective view of a rotary holder to which a cutter according to an embodiment of the present disclosure is attached.

As illustrated in FIG. 3, the output gear 6 has at a center thereof a mounting hole 6a extending therethrough vertically. A disk-shaped rotary holder 5 is then mounted in the mounting hole 6a.

The rotary holder 5 is generally C-shaped in planar view and includes a cutaway part 5a having a gentle circumferential expansion around the rotation axis C1 as the rotary holder 5 extends radially outwardly away from the rotation axis C1, and being open outwardly.

A flange 5b extending outwardly beyond other portions of the rotary holder 5 is formed on an upper peripheral edge of the rotary holder 5.

Then, as illustrated in FIGS. 2 and 3, a pair of fitting surfaces 5c are formed on respective top and bottom surfaces of the rotary holder 5 to be arranged symmetrically along a direction of the rotation axis C1. The fitting surfaces 5c are formed to have a gradual decrease in diameter toward a center portion of the rotary holder 5.

The fitting surfaces 5c have a shape corresponding to a curved shape of a distal end 11a of an electrode tip 11 and fitted with the distal end 11a of the electrode tip 11 with a central axis of the electrode tip 11 being aligned with the rotation axis C1.

An attachment step portion 5d is formed on one of inner faces of the cutaway part 5a extending outwardly from the rotation axis C1. The attachment step portion 5d is generally T-shaped in side view and recessed to form a step.

A metal cutter 1 for cutting a distal end 11a of an electrode tip 11 is attached to the attachment step portion 5d.

Figure 4:
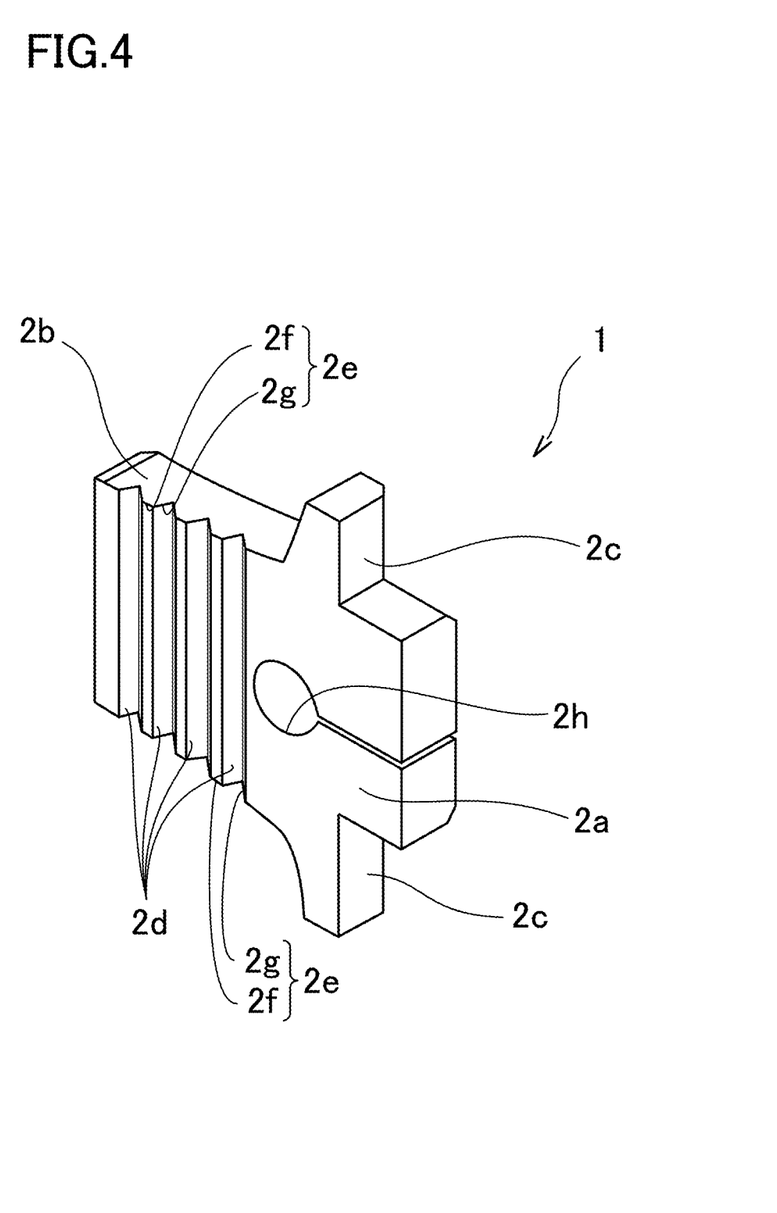
FIG. 4 is a perspective view of a cutter according to an embodiment of the present disclosure.

As illustrated in FIGS. 3 and 4, the cutter 1 is formed by cutting a metal plate into a general T-shape. The cutter 1 is secured to the attachment step portion 5d by means of a screw 3 and a washer 4 through an attachment hole 2h formed at substantial center portion thereof.

The cutter 1 has one plate face facing a bottom surface of the attachment step portion 5d in the state where the cutter 1 is attached to the attachment step portion 5d, and the other plate face forming a rake face 2a. The rake face 2a extends to intersect with a circumference extent around the rotation axis C1.

A pair of flank faces 2b are formed on respective upper and lower parts of the rake face 2a. The flank faces 2b are generally orthogonal to the rake face 2a.

Thus, the pair of flank faces 2b are formed to be spaced at a predetermined interval along the direction of the rotation axis C1. Both of the flank faces 2b have a curved shape such that the flank faces 2b are progressively spaced apart from each other along the direction of the rotation axis C1 as the flank faces 2b extend away from the rotation axis C1.

Both of the flank faces 2b have a shape corresponding to the respective fitting surfaces 5c in the state where the cutter 1 is attached to the rotary holder 5. When electrode tips 11 are brought into proximity to the flank faces 2b with the central axes of the electrode tips 11 being aligned with the rotation axis C1, the flank faces 2*b* face respective distal ends 11*a* of the electrode tips 11.

A pair of positioning recesses 2*c* cut away rectangularly in side view are formed in respective top and bottom portions of the cutter 1 on a side of the cutter 1 away from the rotation axis C1.

Four of recessed grooves 2*d* are then formed on the rake face 2*a* to be spaced at predetermined, equal intervals along a direction intersecting with the rotation axis C1. The recessed grooves 2*d* are generally V-shaped in sectional view and extend straight along the direction of the rotation axis C1 to be open at the flank faces 2*b*.

A pair of cutting blade portions 2*e* extending to intersect with the rotation axis C1 are formed on respective continuous portions of the rake face 2*a* and the flank faces 2*b* to be arranged symmetrically along the rotation axis C1.

Thus, while one of the cutting blade portions 2*e* is formed on a continuous portion of the rake face 2*a* and one of the flank faces 2*b*, the other of the cutting blade portions 2*e* is formed on a continuous portion of the rake face 2*a* and the other of the flank faces 2*b*.

Each of the cutting blade portions 2*e* includes a first region 2*f* made up of an intersecting portion of the rake face 2*a* and the flank face 2*b* and a second region 2*g* made up of a peripheral edge portion of an opening portion of the recessed groove 2*d* at the flank face 2*b*.

The cutting blade portions 2*e* are thus formed in a serpentine configuration along a direction intersecting with the rotation axis C1.

Figure 5:
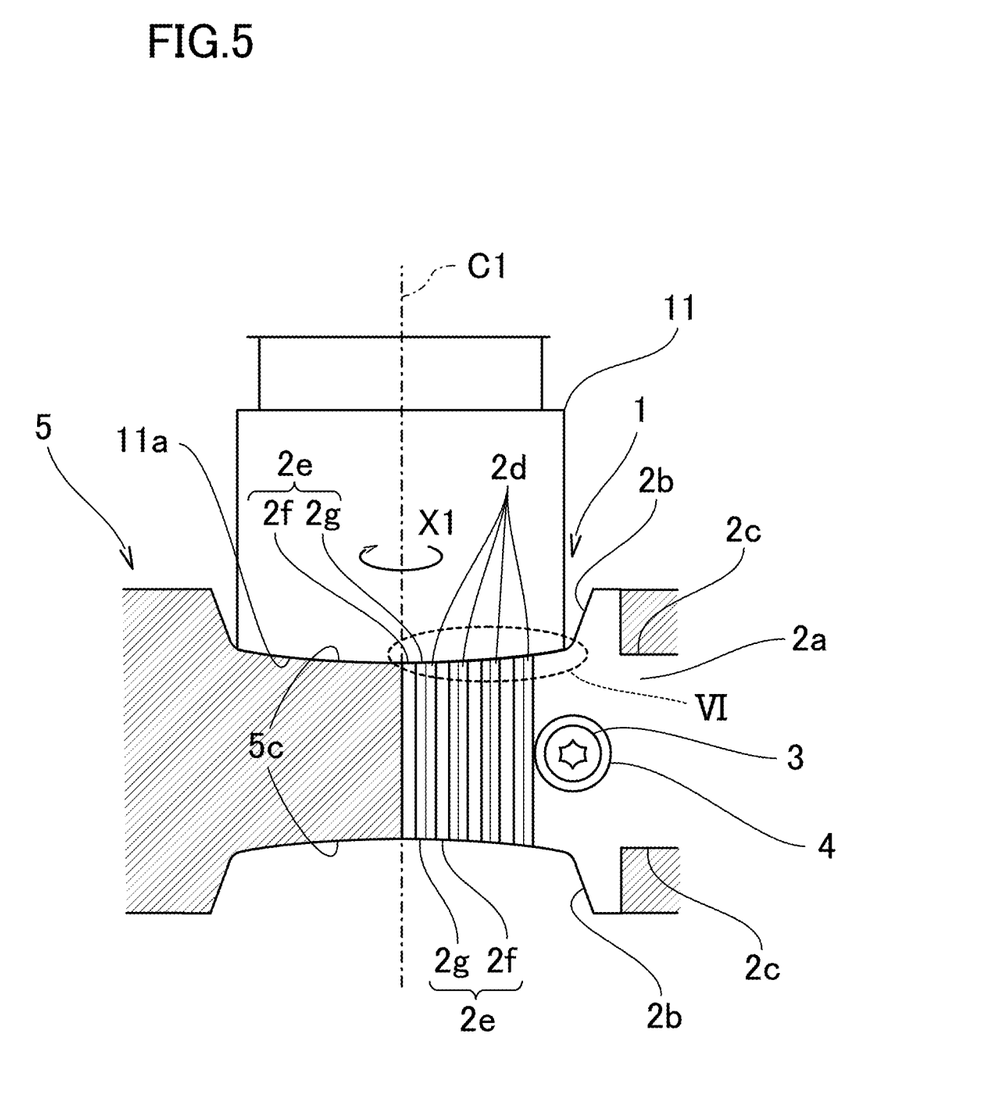
FIG. 5 is an enlarged view of a part V indicated in FIG. 2.
Figure 6:
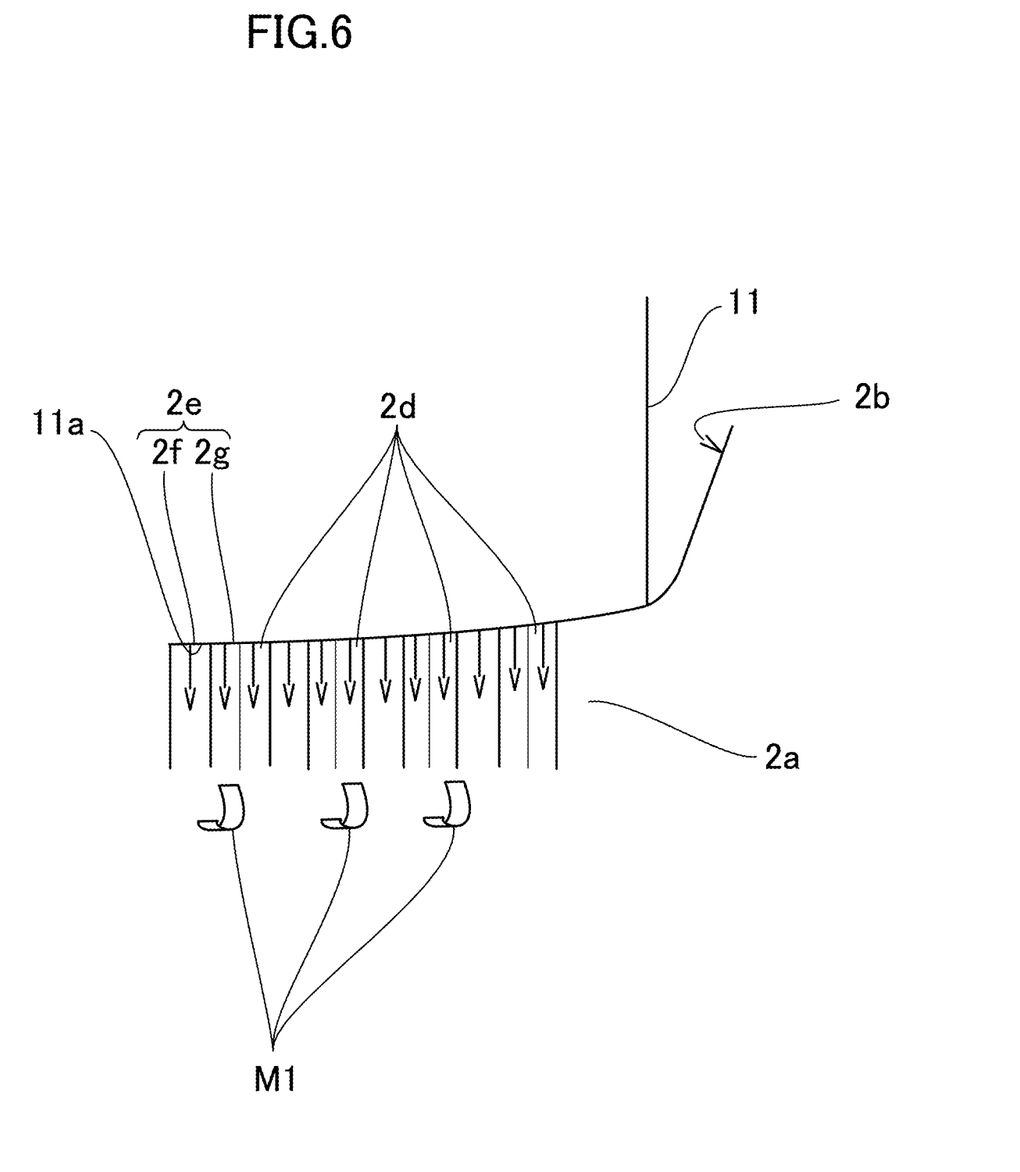
FIG. 6 is an enlarged view of a part VI indicated in FIG. 5.

When electrode tips 11 contact the rotary holder 5 that is rotated in a X1 direction with the central axes of the electrode tips 11 being aligned with the rotation axis C1, the cutter 1 contacts distal ends 11*a* of the electrode tips 11 to cut the distal ends 11*a* of the electrode tips 11 such that the cutting blade portions 2*e* form a plurality of concentric annular ribs (not shown), as illustrated in FIGS. 5 and 6. As a result, a grooved surface is formed on the distal ends 11*a* of the electrode tips 11 and chips M1 are then created.

Next, a cutting operation for distal ends 11*a* of electrode tips 11 by using the tip dresser 10 is described.

First, as illustrated in FIG. 2, a pair of electrode tips 11 having distal ends 11*a* in a deteriorated condition are moved above and below the plate-shaped housing 10*b* of the tip dresser 10, respectively, and the central axes of the electrode tips 11 are brought into alignment with the rotation axis C1.

The drive motor and the gear meshing mechanism of the tip dresser 10 that are not shown are driven in rotation to turn the rotary holder 5 about the rotation axis C1.

Thereafter, the electrode tips 11 are brought into proximity to the respective fitting surfaces 5*c* of the rotary holder 5 along the rotation axis C1 and the distal ends 11*a* of the electrode tips 11 are then fitted into the respective fitting surfaces 5*c*. As illustrated in FIGS. 5 and 6, the cutting blade portions 2*e* of the cutter 1 then contact the respective distal ends 11*a* of the electrode tips 11 to start to cut the distal ends 11*a*. In the operation, a depth of a portion cut by the second region 2*g* of the cutting blade portion 2*e* is larger than that of the first region 2*f* of the cutting blade portion 2*e*. As a result, concentric annular ribs can be formed on the distal ends 11*a* of the electrode tips 11 to provide a grooved surface on the distal ends 11*a* of the electrode tips 11.

As the distal ends 11*a* of the electrode tips 11 are cut by the cutter 1, chips M1 created at the first regions 2*f* of the cutting blade portions 2*e* are produced along the rake face 2*a* and chips M1 created at the second regions 2*g* of the cutting blade portions 2*e* are produced along the recessed grooves 2*d*. In that operation, no gaps are provided between the cutting blade portions 2*e* and the distal ends 11*a* of the electrode tips 11. As a result, the movement of created chips M1 to between the recessed grooves and the electrode tip distal ends, as described in U.S. Pat. No. 8,222,560 (see FIGS. 7 and 8), can be prevented. During the cutting operation to form a grooved surface on the distal ends 11*a* of the electrode tips 11, an excessive load can be prevented from being applied on the rotation of the rotary holder 5. Even when the cutting of the distal ends 11*a* of the electrode tips 11 is then repeated, a grooved surface can be well-formed on the distal ends 11*a* of the electrode tips 11.

In addition, the recessed grooves 2*d* are formed on the rake face 2*a*, but not on the flank faces 2*b*. The recessed grooves 2*d* thus can be machined on a material before determining a shape of the electrode tips 11. Therefore, shorter lead time for developing the cutter 1 can be achieved.

The recessed grooves 2*d* extend along the direction of the rotation axis C1 to be open at the flank faces 2*b* and the pair of cutting blade portions 2*e* are formed symmetrically along the direction of the rotation axis C1. When the central axes of a pair of electrode tips 11 facing one another are brought into alignment with the rotation axis C1 of the rotary holder 5 and the electrode tips 11 are then brought into proximity to the rotating rotary holder 5 to contact distal ends 11*a* of the electrode tips 11 with the cutter 1, a grooved surface is formed on the distal ends 11*a* of the electrode tips 11. Thus, without increased numbers of the recessed grooves 2*d* formed on the rake face 2*a*, the grooved surface can be formed simultaneously on the distal ends 11*a* of two of the electrode tips 11. This enables higher efficiency in cutting the electrode tips 11.

The recessed grooves 2*d* provided on the rake face 2*a* are straight, so that simplified machining for producing the cutter 1 is achieved, enabling further shorter lead time for the development of the cutter 1.

In the embodiments of the present disclosure, the pair of cutting blade portions 2*e* are formed on the cutter 1; however, the embodiments are not limited to this configuration and either one of the cutting blade portions 2*e* may be only provided.

In the embodiments of the present disclosure, the recessed grooves 2*d* each have a V-shaped cross section; however, the embodiments are not limited to this configuration and the recessed grooves 2*d* each may have a curved shape.

In the embodiments of the present disclosure, the recessed grooves 2*d* are each straight, but do not necessarily need to be straight.

In the embodiments of the present disclosure, the four recessed grooves 2*d* are formed on the rake face 2*a*; however, one to three, or five and more of recessed grooves 2*d* may be formed.

The present disclosure is suitable for a tip dressing cutter for use in cutting a distal end of an electrode tip of spot welding.

What is claimed is:

1. A tip dressing cutter attached to a rotary holder that is configured to rotate with a central axis of an electrode tip of spot welding being aligned with a rotation axis of the rotary holder, the tip dressing cutter being configured to contact a distal end of the electrode tip brought into proximity to the rotary holder during the rotation of the rotary holder to cut the distal end, comprising:
  a rake face extending to intersect with a circumferential extent around the rotation axis;

a flank face configured to face the distal end of the electrode tip when the electrode tip is brought into proximity to the rotary holder;

a plurality of recessed grooves formed on the rake face to be spaced at predetermined intervals along a direction intersecting with the rotation axis, the plurality of recessed grooves extending along a direction of the rotation axis to be open at the flank face; and a cutting blade portion formed on a continuous portion of the rake face and the flank face and extending along a direction intersecting with the rotation axis;

wherein the cutting blade portion includes a first region made up of an intersecting portion of the rake face and the flank face and a second region made up of a peripheral edge portion of an opening portion of the recessed grooves at the flank face.

2. The tip dressing cutter according to claim 1, wherein the flank face includes a pair of flank faces formed to be spaced at a predetermined interval along the direction of the rotation axis, the recessed grooves extend along the direction of the rotation axis to be open at each of the flank faces, and the cutting blade portion includes a pair of cutting blade portions formed symmetrically along the direction of the rotation axis, one of the cutting blade portions being formed on a continuous portion of the rake face and one of the flank faces and the other of the cutting blade portions being formed on a continuous portion of the rake face and the other of the flank faces.

3. The tip dressing cutter according to claim 1, wherein the recessed grooves are each straight.

* * * * *